Patented Apr. 17, 1923.

1,452,463

UNITED STATES PATENT OFFICE.

FREDERICK W. HUBER, OF RIVERSIDE, CALIFORNIA.

METHOD AND COMPOSITION FOR CEMENTING OIL WELLS.

No Drawing.  Application filed May 24, 1922. Serial No. 563,378.

*To all whom it may concern:*

Be it known that I, FREDERICK W. HUBER, a citizen of the United States, residing at Riverside, in the county of Riverside and State of California, have invented a new and useful Improvement in Methods and Composition for Cementing Oil Wells, of which the following is a specification.

In the development of oil fields the water encountered in boring must be securely sealed off to prevent its entering the oil bearing strata. This is now most generally done by forcing a thin grout of Portland cement between the walls of the hole and the casing, in such a position as to make a cement plug between the water strata and the oil strata. From the nature of the conditions only a relatively thin grout of water and cement can be used, to insure the necessary fluidity, the amounts of water varying from 0.7 to 0.85 cubic feet for each cubic foot of dry cement used. (A cubic foot of ordinary Portland cement powder weighs about 94 pounds.) A grout as thin as this contains a large excess of water which must be expelled before the grout can settle to a consolidated mass. Such a grout in a vessel, where it can be observed, will settle out, leaving a layer of free water supernatant upon it, before it begins to set up. The process of hardening is very much retarded by this large excess of water and if such a grout is deposited under water or mud fluid, as it necessarily will have to be in an oil bore, the additional dilution will often be such that the cement does not settle out before setting begins and the cement particles become hydrated in suspension and fail to set up into a consolidated mass. Such a cement has the appearance of not having "set up", yet a closer chemical examination reveals the hydration as above mentioned.

Under ordinary conditions the cement after being placed in an oil bore is left undisturbed for from 10 days to two weeks. Experience has taught the oil operator that this length of time is necessary for the cement to develop enough strength to perform its function. If now at the end of this period the cement has failed, the operation must be repeated. This results in much lost time and considerable expense.

I have discovered that if, instead of water, a solution of either calcium chloride, barium chloride or strontium chloride is used to mix the Portland cement to a thin grout, the grout can be deposited through and under water or mud fluid and rapidly settle out to a compact mass which consolidates and hardens very rapidly and at the end of three to four days has a strength sufficient to withstand the stresses to which it is subjected in the oil bore. This increase in strength of a very thin grout is of particular practical importance. For example, I have made a neat grout which contains 50 per cent by weight of water with a given sample of Portland cement and have determined the compressive strength of the hardened mass resulting from this grout at the end of three days. I have also compared this strength with the strength of a hardened mass produced from another grout made from the same cement with a calcium chlorid solution (specific gravity 1.028) (this also being determined at the end of three days) and have found the hardened mass resulting from the grout made with pure water to have a strength of 380 pounds per square inch whilst the hardened mass resulting from the grout made with the calcium chloride solution had a compression strength of 1850 pounds per square inch, (that is, about 480 per cent stronger) in three days. Using barium chloride or strontium chloride solution of equivalent strength gave practically the same increase over the pure water series.

In actual field operations I have taken a core sample of the hardened mass resulting from a calcium chlorid grout of the consistency above referred to which had been deposited in contact with mud laden fluid in an oil bore 3000 feet deep at the end of four days after deposition and found it of such a compactness and hardness as is seldom attained from a grout made with water two to three weeks after deposition.

In practice I prepare a solution of alkaline earth metal chloride; namely, calcium, barium or strontium chlorides, having preferably a concentration of from 2 to 5 per cent and use this solution to mix the grout by any of the methods in common use. The best concentration will depend upon the cement being used. The more concentrated the solution the more rapid the settling out of the cement from the liquid. This settling could even be hastened, by the use of high concentration of calcium chlorid to the point where coagulation takes place in such a short time as not to allow the cement being forced into position in the hole. This settling (coagulation) manifests itself by the grout turning into a clabber like mass which cannot be readily pumped into place on account of the greatly increased viscosity.

The concentration of the chloride solutions must be so regulated that coagulation of the thin grout does not begin until after the grout has been pumped into place in the oil bore. In practice I have found that a concentration of not less than 2 per cent or more than 5 per cent generally gives the desired results. Under 2 per cent, coagulation is generally too slow for the purpose and above 5 per cent it is generally too rapid for safety. I do not wish, however, to limit myself to a specific concentration between these exact limits, in that the brand of cement used, the quantity to be pumped into place and the length of time required to pump the cement grout into place will be variable factors for different conditions and may require considerable variations from these limits.

It will be understood that in addition to the ingredients above mentioned more or less inert material may be present; for example, as impurities in the alkaline earth metal chloride used. My invention includes the use of a thin grout prepared substantially as above described whether or not other inert material is also present, provided it is not present in sufficient amount to interfere with the fluidity of the grout or with the settling and subsequent hardening of the cement.

What I claim is:

1. The method of cementing oil wells which consists in forcing into the space to be cemented, a thin grout consisting of Portland cement, water and an alkaline earth metal chloride, sufficient water being present therein to form a thin grout, capable of being pumped.

2. The method of cementing oil wells which consists in forcing into the space to be cemented, a thin grout consisting of Portland cement, water, and a coagulating agent for accelerating the consolidation and hardening of the cement, such mixture being free from coarse aggregate, and capable of being readily pumped.

3. A method of cementing oil wells which comprises the step of forcing into the space to be cemented, a thin readily flowable grout capable of being readily pumped, such grout containing Portland cement, water and a coagulating and accelerating agent, such agent being one which is capable of accelerating the settling of the cement from the water, is capable of accelerating the hardening of the cement, and is capable of producing a substantially harder mass than would be produced from the cement alone in the same quantity of water, said grout being free from coarse aggregate and capable of being pumped; and thereafter allowing the cement to settle and harden.

4. A method of cementing oil wells which comprises pumping into the space to be cemented, a thin grout comprising about one volume of Portland cement powder, and about 0.7 to 0.85 volume of an aqueous solution of calcium chlorid of about 2 to 5% strength, and allowing the same to settle and harden.

5. A composition for cementing oil wells comprising Portland cement and an alkaline earth metal chloride and sufficient water to form a grout which is sufficiently thin to flow readily and to be readily pumped, such composition being free from coarse aggregate. which would interfere with pumping the same.

6. A composition for cementing oil wells comprising a thin grout containing Portland cement and a 2 to 5% solution of alkaline earth metal chloride, said grout containing from 0.7 to 0.85 cubic feet of such solution for each cubic foot of dry cement used, and being free from coarse aggregate, so that it can readily be pumped.

7. A composition for cementing oil wells consisting of a thin grout of Portland cement, water, and a coagulating agent for accelerating the consolidation and hardening of the cement, such grout being capable of being readily pumped by ordinary pumps adapted to handle liquid materials.

In testimony whereof I have hereunto subscribed my name this 18th day of May, 1922.

FREDERICK W. HUBER.